Aug. 22, 1939. V. R. A. DALENIUS ET AL 2,170,425
MACHINE FOR SLICING SALMON
Filed March 31, 1938   2 Sheets-Sheet 1

INVENTORS:
VALTER RAMSES ANGELO DALENIUS
JEAN LUDVIG NYSTRÖM
BY Haseltine, Lake & Co.
ATTORNEYS.

Aug. 22, 1939.  V. R. A. DALENIUS ET AL  2,170,425
MACHINE FOR SLICING SALMON
Filed March 31, 1938    2 Sheets-Sheet 2
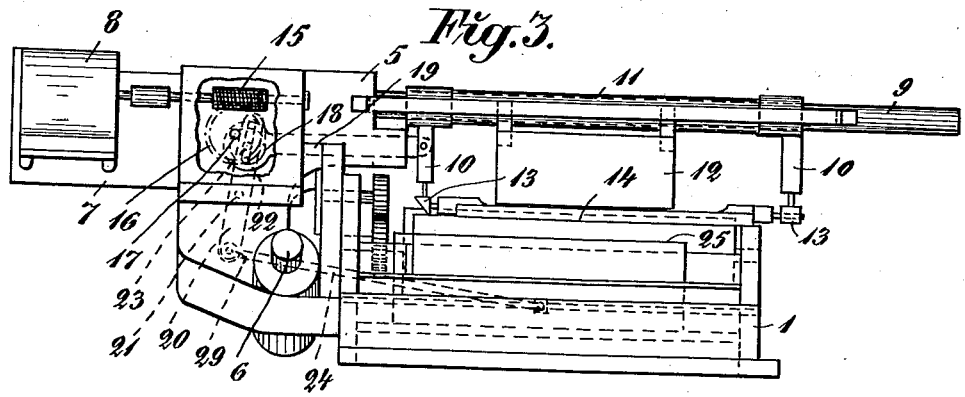
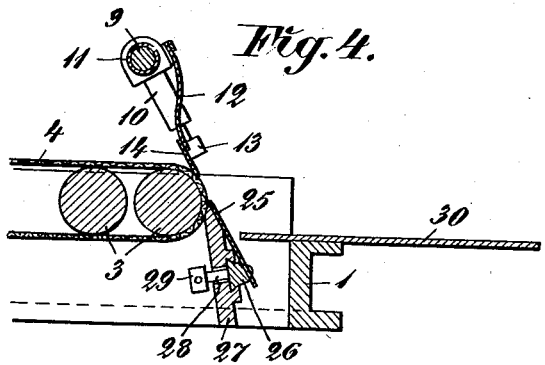
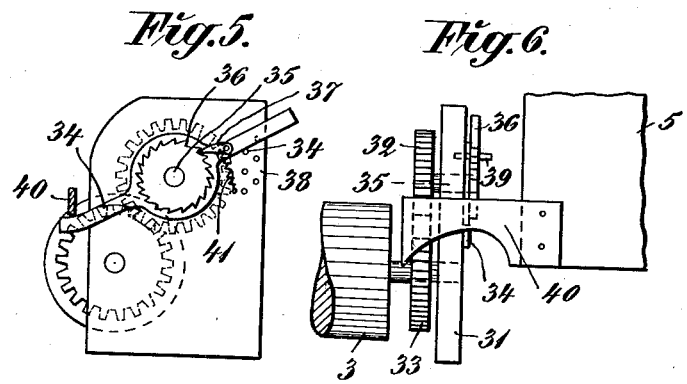
INVENTORS:
VALTER RAMSES ANGELO DALENIUS
JEAN LUDVIG NYSTRÖM
BY Haseltine, Lake & Co.
ATTORNEYS Patented Aug. 22, 1939

2,170,425

UNITED STATES PATENT OFFICE 2,170,425

MACHINE FOR SLICING SALMON

Valter Ramses Angelo Dalenius and Jean Ludvig Nyström, Stockholm, Sweden

Application March 31, 1938, Serial No. 199,102
In Sweden April 12, 1937

3 Claims. (Cl. 17—4)

This invention relates to a machine for slicing salmon in a very particular and effective manner. Salmon, as is well known, is cut in slices from pieces on which the skin is still left on one side, the underside, the slicing having to be completed in such a manner that the skin does not accompany the cut off slices. It has been very difficult to design a mechanically operated slicing apparatus for salmon capable of working satisfactorily and to cut slices of even thickness without at the same time cutting off larger or smaller parts of accompanying skin.

The present invention has for its object to produce a machine for slicing salmon in which said disadvantage is removed, and it is substantially characterized by including an endless conveyor mounted in a machine frame to transport step by step the piece of salmon to be sliced, a holder pivotally journalled in the frame and carrying an obliquely positioned knife which is movable back and forth in the longitudinal direction of the holder, a knife mounted movable back and forth immediately in front of and level with the conveyor, and a motor-driven transmission device for moving the knives back and forth in such a manner, that the knives are displaced in opposite directions, the knife secured to the holder being adapted to cut the salmon slice from the top clear down to the skin at the underside, when the holder is turned downwards, whereas the second knife is adapted only to cut loose from the skin the slice of salmon thus cut off.

An embodiment of the invention is illustrated on the accompanying drawings.

Figure 1:
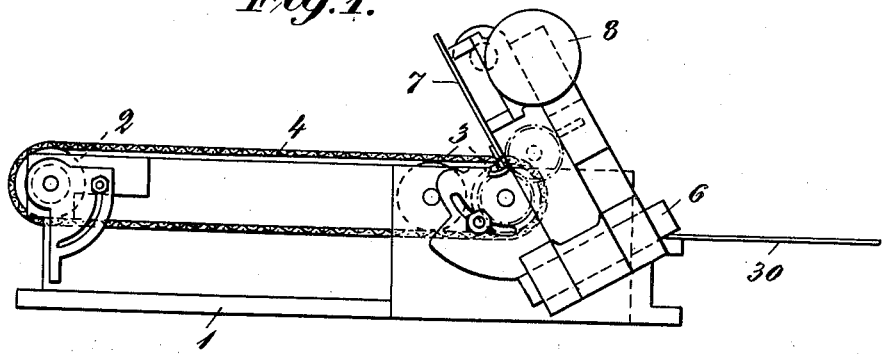
Figure 2:
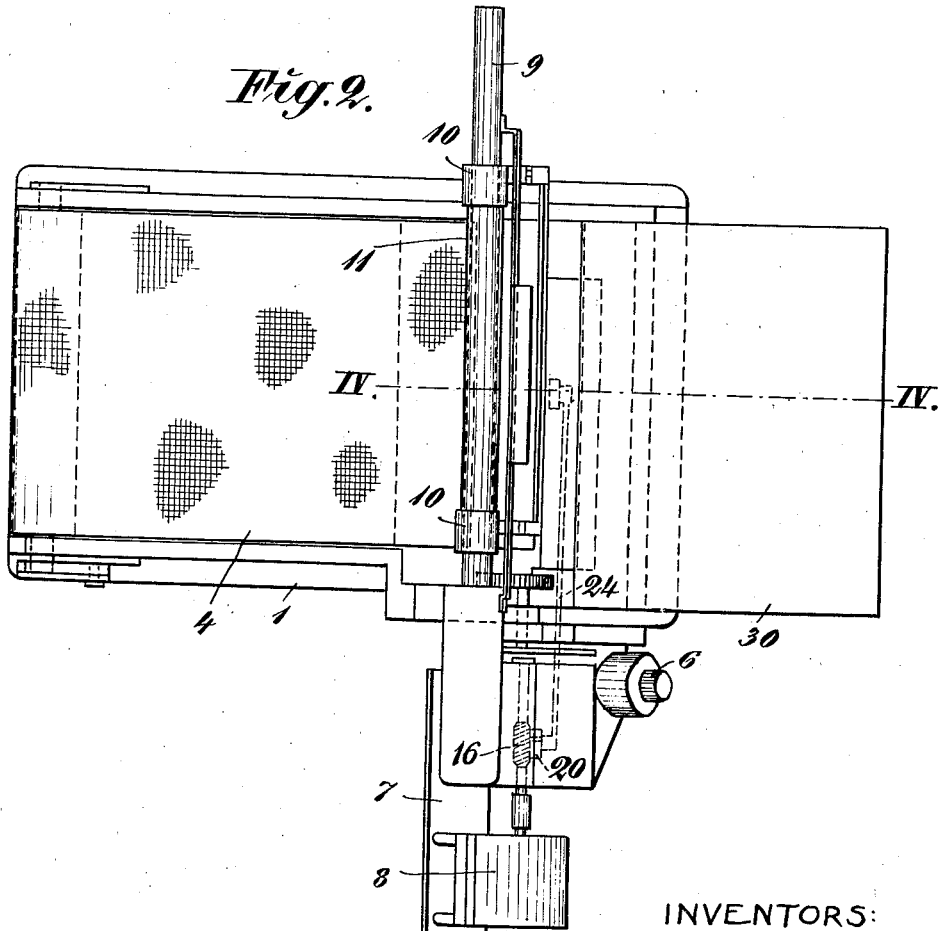

Fig. 1 is a side elevation, Fig. 2 is a plan view, and Fig. 3 an end elevation of the machine. Fig. 4 is a vertical section on the line IV—IV in Fig. 2. Figs. 5 and 6 show two detail views, perpendicularly to each other, of the main parts of the feed mechanism.

On the drawings, 1 designates the machine frame in which driving and supporting rollers 2, 3 for an endless traveling belt conveyor 4 are journalled, on which the pieces of salmon are fed forwards towards the slicing apparatus. 5 designates the holder of the slicing apparatus, said holder being pivotally mounted in the frame 1 by means of the obliquely positioned pin 6. The one end of the holder 5 is adapted to serve as a table 7 on which a driving motor 8 for the knives is mounted. The opposite end of the holder 5 consists of a horizontal rod 9 secured to the table 7. On the rod 9 two arms 10 are secured, between the hubs of which a tube 11 is mounted around the rod 9. The tube 11 carries a stop plate 12 against which the forward end of the piece of salmon abuts while being sliced. Between the ends 13 of the arms 10 a thin knife blade 14 is clamped.

The motor 8 drives a worm 15 in mesh with the worm wheel 16, on the shaft 17 of which an eccentric 18 is secured. The eccentric rod 19 connects the eccentric 18 with one of the arms 10 so as to give to the knife 14 a reciprocating motion when the motor is started.

20 is a double-armed lever pivotally journalled on the holder at 21. Said lever is provided in one end with an elongated hole 22, engaged by a crank pin 23 which for example may be provided on the eccentric 18. By this means, the lever 20 will obtain an oscillating turning motion synchronous with the motion of the knife 14, the lower end of the lever, however, being always moved in a direction opposite to that of the knife 14. This motion of the lever is transmitted to the lower knife by means of a link or connecting rod 24.

The two knives 14, 25 are, as indicated in Fig. 4, obliquely positioned with their edges turned towards each other, and they will as already stated be reciprocated back and forth in opposite directions when the motor is running. The lower knife 25 is secured to a dove-tail shaped guide rail 26 inserted in a corresponding groove in the wall 27 rigidly connected to the machine frame. On the rail 26 a pin 28 is attached, passing through a longitudinal slot in the wall 27 and being pivotally connected to the above mentioned link 24 by means of the pivotable head 29 so that the rail 26 will be reciprocated while carrying along the knife 25. The edge of the knife 25 is located at such a distance from the conveyor that the salmon skin, as it is being gradually loosened from the flesh, may find its way downwards between the knife edge and the conveyor.

When the apparatus is to be used and the piece of fish has been placed on the conveyor so that it will abut against the stop plate 12, the end of the rod 9 is grasped by the hand and turned upwards so that the whole holder 5 with the motor, the upper knife and the transmission mechanism is turned upwards about the axis 6. The motor is now started so that both knives will move back and forth in opposite directions. Then the rod 9 is again turned downwards while the upper knife is working its way through the flesh cutting out a thin slice. The rod 9 is turned downwards so far that the knife edge, which in the final position will be substantially or almost horizontal, just reaches but does not penetrate the skin attached to the underside of the flesh. Thus the bottom portion of the slice will still be connected below with the skin, until the slice is cut off from said skin by the reciprocating lower knife. The cut off slice then drops down on the collecting table 30.

When the upper knife is again turned upwards, the conveyor and thus also the piece of fish is moved forwards one step, the length of which corresponds to the thickness of the cut slices. This feed motion is accomplished by a pawl-feed mechanism. This mechanism includes two spur gears 32, 33 being in mesh and journalled in the frame plate 31, the spur gear 33 being mounted on the shaft of the feed roller 3, and the spur gear 32 being mounted on the same shaft 35 as the lever 34 of the pawl-feed mechanism. On the shaft 35 the ratchet wheel 36 is mounted, the toothed circumference of which is engaged by the pawl 37 pivotally journalled on the lever 34. 38 designates a number of holes. By inserting a stop pin 39 in one of these holes, the size of the feed and thus the thickness of the slices may be adjusted at will. The lever 34 is loosely mounted but the ratchet wheel 36 rigidly mounted on the shaft 35. 40 is a projecting member secured on some suitable portion of the holder 5 so that the member 40 is moved downwards when the holder 5 is turned upwards. The spring 41 of the pawl is attached to the plate 31 and turns the lever 34 so that the latter will abut against the pin 39. This starting position of the lever determines the amount of the feed.

When the projecting member 40 is pressed down, the left end (Fig. 5) of the pawl 37 is also pressed down whereby the pawl 37 turns the ratchet wheel 36 and thus the spur gears 32, 33 and the feed roller 3, from the moment when the member 40 strikes the lever 34, which moment will occur sooner or later depending on the starting position of the lever.

The arrangement illustrated on the drawings is only to be considered as an exemplified embodiment as the details of the embodiment may be varied within wide limits. Thus, for example, it is not necessary to mount the drive motor on the pivotable holder. The motor may instead be mounted on the machine frame, in which case the transmission device for the motion of the knives is subjected to a corresponding change.

Having now particularly described the nature of our invention and the manner of its operation what we claim is:

1. A machine for slicing salmon comprising a machine frame, an endless conveyor for pieces of salmon mounted in said frame, means for driving said conveyor step by step in a forward direction, means for reciprocating said upper knife back and forth in the longitudinal direction of said holder, a second or lower knife mounted to be reciprocated back and forth immediately in front of and substantially on a level with said conveyor, a transmission device driven by a motor and adapted to reciprocate said knives back and forth in opposite directions, the upper knife mounted on the holder being adapted to cut the piece of salmon from the top side down to the skin at the underside upon the holder being turned downwards, and the second lower knife being thereupon adapted to cut loose from the skin the slice thus cut by the upper knife.

2. Machine for slicing salmon according to claim 1, in which the transmission device consists of a worm mounted on the motor shaft, and which machine includes a worm wheel in mesh with said worm, a double armed lever pivotally journalled in the machine frame a connecting rod connected to the upper knife, an eccentric mounted about the axis of said worm wheel and adapted to operate said connecting rod, a crank pin also mounted on said latter axis and engaging a slot in one end of said double-armed lever, the second end of said lever being pivotally connected to one end of said connecting rod, and the second end of said connecting rod being pivotally connected to the lower knife.

3. Machine for slicing salmon according to claim 1, in which the means for feeding the endless conveyor forwards in steps, comprises a feed roller for the endless conveyor, a ratchet wheel mounted on the axis of said feed roller, a lever pivotally mounted on the shaft of said feed roller, a pawl mounted on said lever and being in mesh with the teeth of said ratchet wheel, a member connected with the holder of the upper knife and adapted to actuate said lever when the holder is being turned downwards, and means for adjusting said lever to different starting positions so that said member will strike the lever sooner or later and turn it together with said ratchet wheel and said feed roller.

VALTER RAMSES ANGELO DALENIUS.
JEAN LUDVIG NYSTRÖM.